US009206750B2

(12) United States Patent
Kagoshima et al.

(10) Patent No.: US 9,206,750 B2
(45) Date of Patent: Dec. 8, 2015

(54) CONTROLLER FOR VEHICLE INCLUDING COMPUTATION OF A FEEDBACK AMOUNT BASED ON A FILTERED INPUT SIGNAL

(75) Inventors: Takashi Kagoshima, Obu (JP); Tokutada Takahashi, Obu (JP)

(73) Assignee: DENSO CORPORATION, Kariya (JP)

( * ) Notice: Subject to any disclaimer, the term of this patent is extended or adjusted under 35 U.S.C. 154(b) by 435 days.

(21) Appl. No.: 13/604,916

(22) Filed: Sep. 6, 2012

(65) Prior Publication Data

US 2013/0131889 A1 May 23, 2013

(30) Foreign Application Priority Data

Nov. 21, 2011 (JP) ................................ 2011-253456

(51) Int. Cl.

| | |
|---|---|
| ***G06F 17/00*** | (2006.01) |
| ***F02D 31/00*** | (2006.01) |
| ***F02D 41/00*** | (2006.01) |
| *F02D 41/14* | (2006.01) |

(52) U.S. Cl.

CPC .......... *F02D 31/003* (2013.01); *F02D 41/0097* (2013.01); *F02D 2041/1432* (2013.01)

(58) Field of Classification Search

USPC ..................................................... 701/1, 110

See application file for complete search history.

(56) References Cited

U.S. PATENT DOCUMENTS

| | | | | |
|---|---|---|---|---|
| 5,379,634 | A * | 1/1995 | Kuroda et al. | 73/114.04 |
| 5,495,835 | A | 3/1996 | Ueda | |
| 5,560,336 | A * | 10/1996 | Takahashi et al. | 123/406.24 |
| 5,647,317 | A * | 7/1997 | Weisman et al. | 123/299 |
| 6,959,688 | B2 * | 11/2005 | Kurt-Elli | 123/319 |
| 2003/0196647 | A1 * | 10/2003 | Christner et al. | 123/672 |
| 2007/0156322 | A1 * | 7/2007 | Soga et al. | 701/104 |
| 2008/0098806 | A1 * | 5/2008 | Shikama et al. | 73/119 R |
| 2009/0076707 | A1 * | 3/2009 | Sugiyama et al. | 701/103 |
| 2009/0158832 | A1 * | 6/2009 | Machida et al. | 73/114.27 |

FOREIGN PATENT DOCUMENTS

| | | |
|---|---|---|
| JP | 3331793 | 7/2002 |
| JP | 2011-111965 | 6/2011 |

OTHER PUBLICATIONS

Machine translation of JP-08-177548.*

Machine translation of JP 2011111965 A.*

Office Action (1 page) dated Oct. 29, 2013, issued in corresponding Japanese Application No. 2011-253456 and English translation (2 pages).

* cited by examiner

*Primary Examiner* — Rami Khatib

*Assistant Examiner* — Navid Ziaeianmehdizadeh

(74) *Attorney, Agent, or Firm* — Nixon & Vanderhye PC

(57) ABSTRACT

When an idle speed control is implemented, an engine speed is computed based on an output signal of a crank angle sensor at a specified processing angle interval, and a time interval corresponding to the specified processing angle interval is computed. Then, the engine speed is filtered at a specified processing time interval, and a feedback amount (throttle opening correction amount) is computed based on a deviation of an engine speed filtered by a filter portion from a target engine speed. A time constant of a filtering processing is established according to the processing angle interval. Therefore, a filtering processing and a feedback control processing are performed in synchronization with each other, and an instability of an output of the feedback control (feedback amount) can be reduced.

4 Claims, 5 Drawing Sheets

CONTROLLER FOR VEHICLE INCLUDING COMPUTATION OF A FEEDBACK AMOUNT BASED ON A FILTERED INPUT SIGNAL

CROSS-REFERENCE TO RELATED APPLICATION

This application is based on Japanese Patent Application No. 2011-253456 filed on Nov. 21, 2011 , the disclosure of which is incorporated herein by reference.

TECHNICAL FIELD

The present disclosure relates to a controller for a vehicle. In the controller for a vehicle, a feedback amount is computed based on a specified control input.

BACKGROUND

Japanese Patent No. 3331793 shows an engine control system in which an engine speed is computed based on an output of a crank angle sensor. The engine speed is filtered at a processing interval which is synchronized with the engine speed. A variation amount in engine speed, from which an affect of combustion variations in each cylinder removed, is computed based on the filtered engine speed. The variation amount in engine speed is feedback-controlled so as to be in a target range. The variation amount in engine speed is referred to as an engine speed variation, hereinafter.

In the above engine control system, the engine speed variation is computed after the engine speed is filtered at the processing interval which is synchronized with the engine speed. When the processing interval becomes longer than a processing interval of a feedback control which is performed based on the engine speed variation, it is likely that the filtered engine speed for feedback control may not be varied even though an actual engine speed is varied. In this case, it may be erroneously determined that a feedback correction does not work effectively to increase a feedback amount. Thus, an output of the feedback control (feedback amount) becomes unstable.

SUMMARY

It is an object of the present disclosure to provide a controller for a vehicle in order to decrease an instability of an output of a feedback control even when a first processing interval of computing an input signal is longer than a second processing interval of computing a feedback amount.

The present disclosure includes an input signal computing portion, a filter portion and a feedback amount computing portion. The input signal computing portion computes an input signal for a feedback control. The filter portion performs a filtering processing for filtering the input signal which is computed by the input signal computing portion. The feedback amount computing portion computes the feedback amount based on both the input signal filtered by the filter portion and a target input value. The first processing interval is computed by the input signal computing portion, and the second processing interval is computed by the feedback amount computing portion. In the controller for the vehicle in which at least one of the first processing interval and the second processing interval is varied, a third processing interval of filtering the input signal by the filter portion is established equal to the second processing interval. Besides, the filter portion establishes a time constant of a filtering processing according to the first processing interval.

Since the third processing interval is established equal to the second processing interval, even when the first processing interval becomes longer than the second processing interval, the filtering processing and a feedback amount computing processing are performed in synchronization with each other. Thus, an output of the filtering processing can be output as a continuous signal, and an instability of the output of the feedback control (feedback amount) can be reduced. Furthermore, the time constant of the filtering processing is established according to a processing time interval which corresponds to the first processing interval. Thus, even when the first processing interval is varied, the time constant of the filtering processing is also changed to a proper value.

The time constant of the filtering processing may be established smaller than or equal to an upper limit guard value and larger than or equal to a lower limit guard value. Therefore, it is avoided that the time constant of the filtering processing becomes too large or too small. The time constant can be variably established in a proper range.

BRIEF DESCRIPTION OF THE DRAWINGS

The above and other objects, features and advantages of to e present disclosure will become more apparent from the following detailed description made with reference to the accompanying drawings. In the drawings.

DETAILED DESCRIPTION

Figure 1:
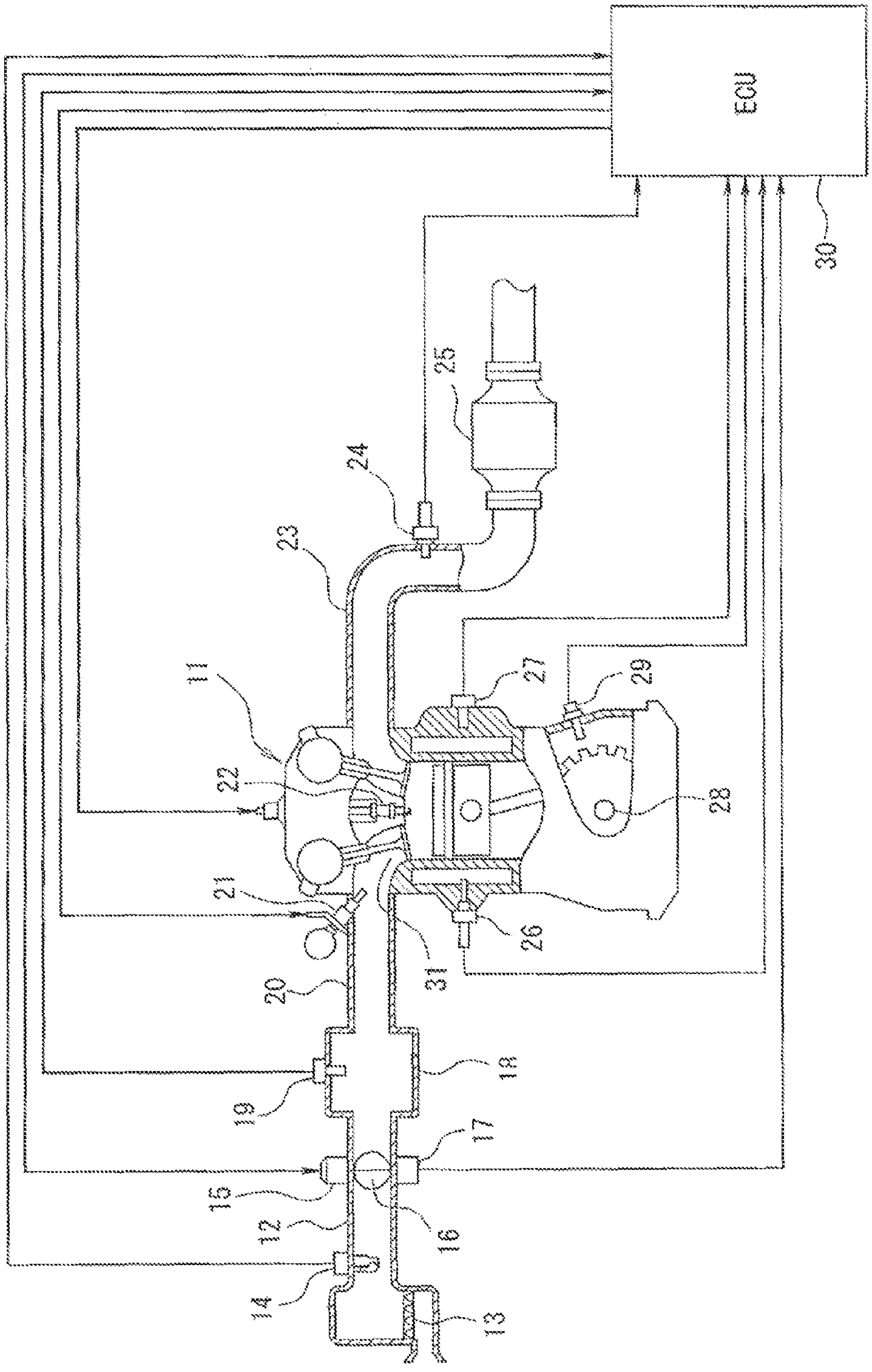
FIG. 1 is a construction diagram showing an outline of an engine control system according to an embodiment.

Hereafter, embodiments of the present disclosure will be described according to the drawings. The following embodiments are specific examples, and the present disclosure is not limited to these embodiments.

[Embodiment]

Hereafter, a specific embodiment according to the present disclosure will be described.

An air cleaner 13 is provided most upstream of an intake passage 12 of an internal combustion engine 11. An air flow meter 14 detecting an intake air flow rate is provided downstream of the air cleaner 13. A throttle valve 1 driven by a motor 15, and a throttle position sensor 17 detecting an opening degree of the throttle valve 16 (throttle opening degree) are provided downstream of the air flow meter 14.

A surge tank 18 is provided downstream of the throttle valve 16. An intake air pressure sensor 19 which detects an intake air pressure is provided in the surge tank 18. An intake manifold 20 introducing an air into each cylinder of the engine 11 is provided downstream of the surge tank 18. A fuel injector 21 which injects a fuel into an intake port 31 is attached on or near the intake port 31 which is connected with the intake manifold 20 of each cylinder. An ignition plug 22 is attached on each cylinder head of the engine 11. An air-fuel mixture in each cylinder is ignited by a spark discharge of each ignition plug 22.

An exhaust gas sensor 24 such as an air-fuel ratio sensor and an oxygen sensor, which detects an air-fuel ratio or rich/lean condition of an exhaust gas, is provided in an exhaust passage 23 of the engine 11. A catalyst 25 such as a three-way catalyst, which purifies the exhaust gas, is provided downstream of the exhaust gas sensor 24.

A coolant temperature sensor 26 which detects an engine coolant temperature and a knock sensor 27 which detects a knocking are disposed on a cylinder block of the engine 11. A crank angle sensor 29, which outputs a pulse signal every time when a crank shaft 28 rotates a specified crank angle, is attached on an exterior of the crank shaft 28. A crank angle and an engine speed are detected based on an output signal of the crank angle sensor 29.

Outputs of various sensors above are transmitted into an electronic control unit (ECU) 30. The ECU 30 includes a micro computer and a ROM (memory medium). The ECU 30 controls a fuel injection quantity, an ignition timing and the throttle position (an intake air flow rate) according to an engine operation condition by implementing various programs stored in the ROM.

When the engine 11 is at idling state, the ECU 30 implements an idle speed control in which the throttle position (intake air flow rate) is feedback controlled so that the engine speed detected by the crank angle sensor 29 agrees with a target idle engine speed.

Figure 2:
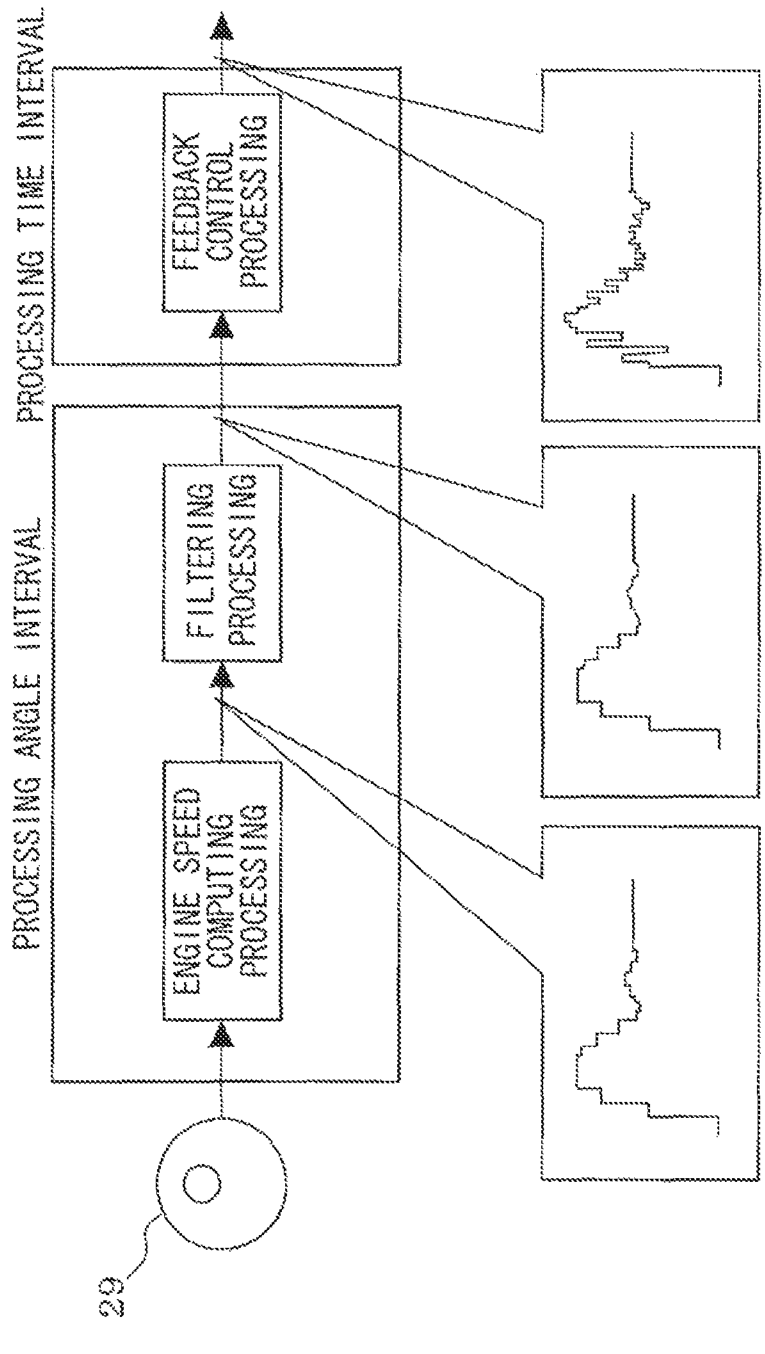
FIG. 2 is a block diagram showing an idle speed control of a comparative embodiment.

According to a comparative example shown in FIG. 2, when an idle speed control is implemented, the engine speed is computed at every specified processing angle interval (30° CA interval) based on an output signal of the crank angle sensor 29. Then, the engine speed is filtered. A feedback amount (throttle opening correction amount) is computed at a specified processing time interval such as 4 millisecond based on a deviation of the filtered engine speed from the target engine speed. In this system, the following issue occurs.

When a first processing interval for computing the engine speed becomes longer than a specified processing time interval due to an engine speed variation, the processing intervals of the engine speed computing processing and the engine speed filtering processing become longer than a second processing interval of a feedback control processing. In such a case, even though an actual engine speed is varied, it is likely that the filtered engine speed for feedback control may not be varied. It may be erroneously determined that a feedback correction does not work effectively to increase a feedback amount. Thus, an output, of the feedback control (feedback amount) becomes unstable.

Figure 3:
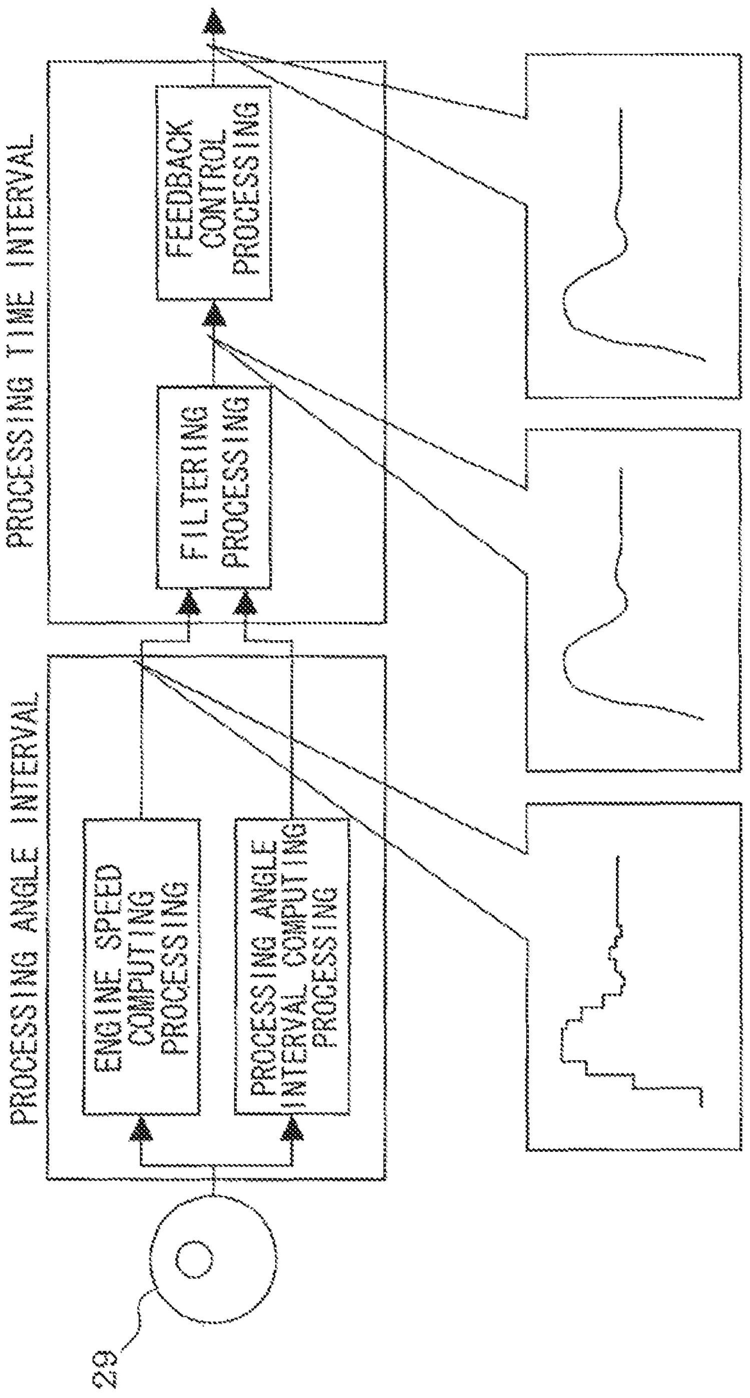
FIG. 3 is a block diagram showing an idle speed control according to the embodiment.
Figure 4:
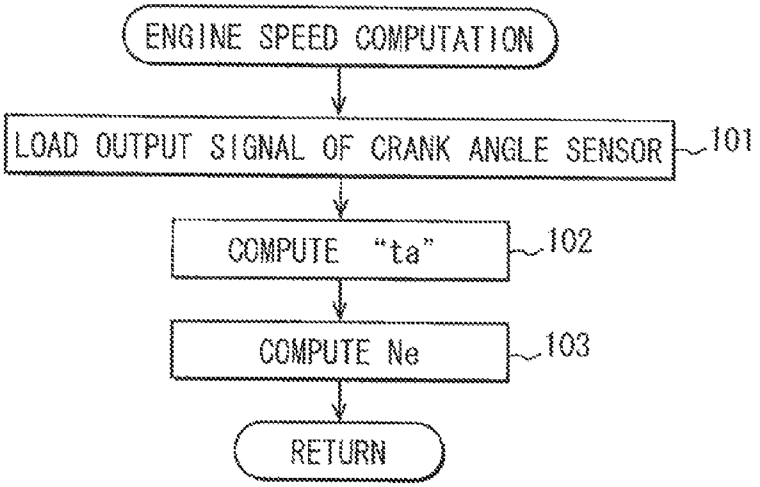
FIG. 4 is a flowchart showing a procedure of an engine speed computing routine.
Figure 5:
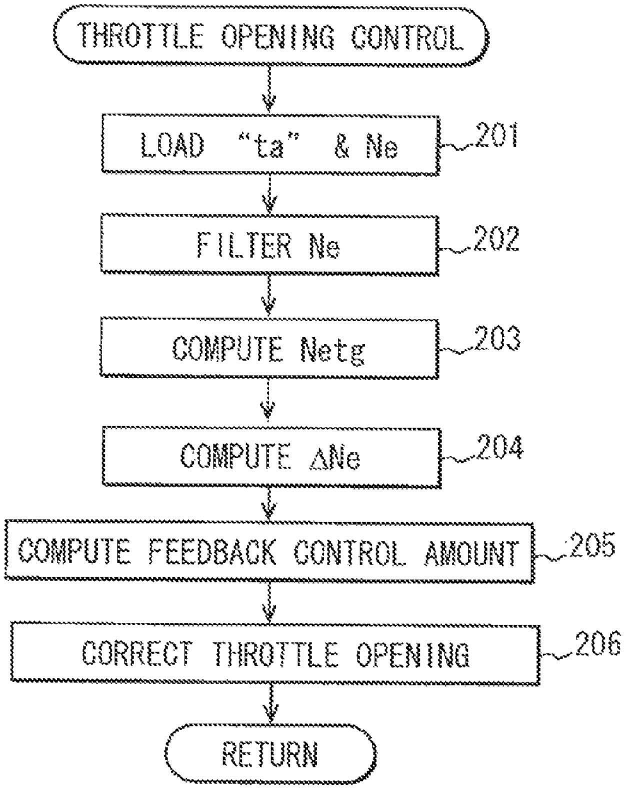
FIG. 5 is a flowchart showing a procedure of a throttle opening controlling routine.

In the present disclosure, each routine for an idle speed control, which will be described hereafter referring to FIGS. 4 and 5, is implemented by the ECU 30. As shown in FIG. 3, when an idle speed control is implemented, an engine speed (input) Is computed at a specified processing angle, interval such as 30° CA interval based on the output signal of the crank angle sensor 29. A processing time interval corresponding to a time interval of the specified processing angle interval is computed, which is referred to as a processing angle interval. Then the engine speed is filtered at the specified processing time interval (for example, 4 millisecond), and the feedback amount is computed based on the deviation of the filtered engine speed from the target engine speed (target input value). A time constant of the filtering processing is established according to the processing angle interval.

A third processing interval of the filtering processing is established equal to the second processing interval of the feedback control processing. Even when the processing angle interval becomes longer than the second processing interval of the feedback control processing, the filtering processing and the feedback control processing are performed in synchronization with each other. Thus, an output of the filtering processing can be transmitted into the feedback control processing as a continuous signal and an instability of the output of the feedback control can be reduced.

An engine speed computing routine show in FIG. 4 is repeatedly executed at a specified processing angle interval "TA" such as 30° CA interval when the engine is at idle state. In step 101, the output signal of the crank angle sensor 29 is loaded. In step 102, the processing angle interval "ta" is computed based on the time interval of the output signal of the crank angle sensor 29. The processing angle interval "ta" corresponds to the specified processing angle interval "TA". The processing angle interval "ta" corresponds to the first processing interval.

In step 103, an engine speed Ne (input signal) is computed based on the time interval of the output signal of the crank angle sensor 29. The process of step 103 corresponds to an input computing portion. The first processing interval is a time interval at which the input computing portion computes the input value (engine speed).

A throttle opening control routine shown in FIG. 5, is repeatedly executed at a specified processing time interval Ts such as 4 milliseconds when the engine is at idling state. In step 201, the processing angle interval "ta" corresponding to the specified processing angle interval "TA" and an engine speed Ne are loaded. In step 202, and the engine speed Ne will be filtered as the follows.

The time constant of the filtering processing is established according to the processing angle interval "ta". In the present embodiment, the processing angle interval "ta" is defined as the time constant "ta". The time constant "ta" is established smaller than or equal to an upper limit guard value and larger than or equal to a lower limit guard value (guard-processed). The present engine speed Ne is filtered (first order lag-processed or smoothing-processed) according to a following equation (1) using the time constant "ta" which is guard-processed so as to compute a filtered engine speed Ne(i).

$$Ne(i)=(Ts\times Ne+ta\times Ne(i-1))/(Ts+ta) \quad (1)$$

"Ne(i)" represents the current filtered engine speed after filtered, and "Ne(i−1)" represents the previous filtered engine speed. "Ts" represents a sampling interval of engine speed Ne.

The method of filtering the engine speed Ne may be changed. For example, a time constant Ksm of filtering is computed according to the processing angle interval "ta". The time constant Ksm is smaller than or equal to an upper limit guard value and larger than or equal to a lower limit guard value. The current filtered engine speed Ne is first-order-filtered and the filtered engine speed Ne(i) may be computed according to the following equation (2) using the guard-processed time constant Ksm.

$$Ne(i)=Ksm\times Ne+(1-Ksm)\times Ne(i-1)\ (0<Ksm<1) \quad (2)$$

The process of step 202 corresponds to a filter portion,

In step 203, a target engine speed Netg is computed according to the engine operation condition such as an engine coolant temperature. In step 204, the deviation ΔNe of the filtered engine speed Ne from the target engine speed Netg is computed according to the following equation (3).

$$\Delta Ne=Ne-Netg \quad (3)$$

In step 205, the feedback amount is computed by a PID control so that the ΔNe becomes smaller. The process of step 205 is corresponds to a feedback amount computing portion.

In step 206, the throttle opening is corrected by using the feedback amount. Thus, the throttle opening is feedback-controlled so that the engine, speed agrees with the target engine speed.

Figure 6A:
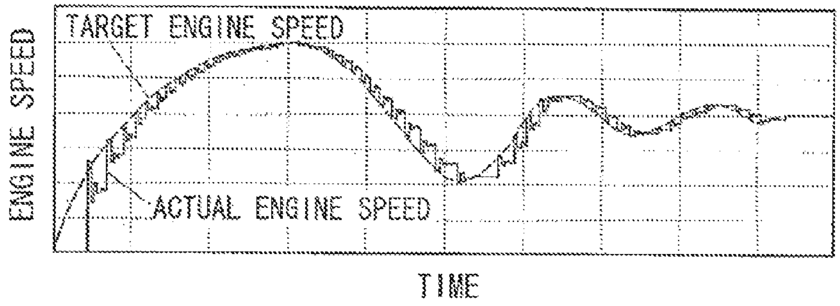
FIGS. 6A to 6D are time charts showing effects of the embodiment.

As shown in FIG. 6A, in a first comparative example, when the engine speed is low, the feedback amount is unstable and the actual engine speed is unstable. In this case, when the idle speed control is implemented, the engine speed is computed and filtered at the specified processing angle interval, and the feedback amount is computed a specified processing interval based on the deviation of the filtered engine speed from the target engine speed.

Figure 6B:
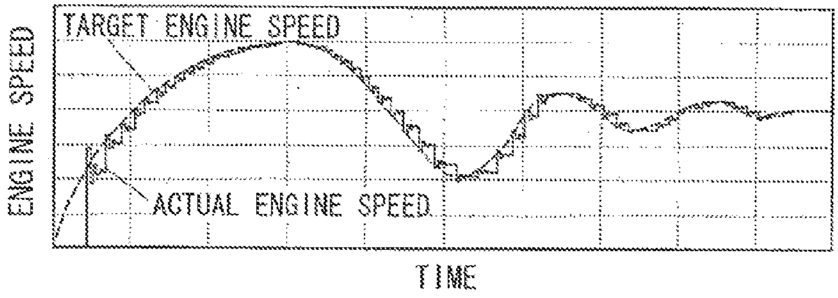
Figure 6C:
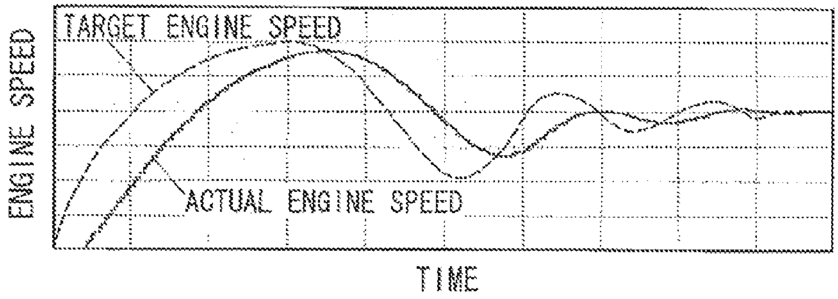
Figure 6D:
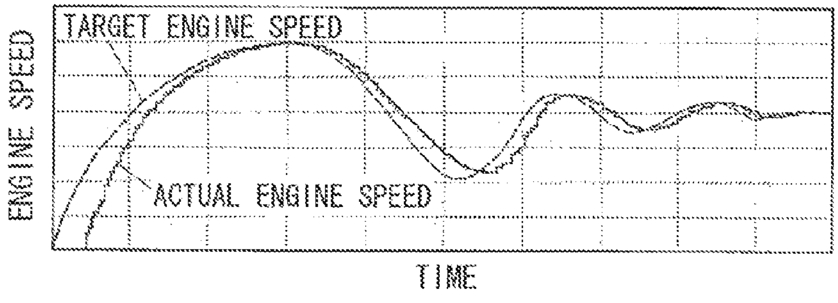

Meanwhile, as shown in FIG. 6D, in the present embodiment, when the idle speed control is implemented, the engine speed is computed and filtered at the processing angle interval “ta”. The feedback amount is computed based on the deviation of the engine speed filtered at the processing angle interval “ta” from the target engine speed. In this case, since the third processing interval of the filtering processing is established equal to the second processing interval of the feedback control processing, even when the processing angle interval “ta” for computing the engine speed becomes longer than the specified processing angle interval, and even when the first processing interval becomes longer than the second processing interval, the filtering processing and the feedback control processing are performed in synchronization with each other, and the output of the filtering processing can be inputted into the feedback control process as a continuous signal. Thus, the instability of both the feedback amount and the actual engine speed can be reduced.

Furthermore, since the filtering processing and the feedback control processing are performed in synchronization with each other, a common gain can be used in the feedback control processing, regardless of the processing angle interval. In other words, it is unnecessary to consider the variation of the processing angle interval when establishing the gain of the feedback control processing. Thus, the gain of the feedback control processing can be easily established.

In a second and a third comparative embodiment which is respectively shown in FIGS. 6B and 6C, the time constant of the filtering processing is fixed. As shown in FIG. 6B, when the time constant (fixed value) of the filtering processing is too small, the feedback amount becomes unstable and the actual engine speed becomes unstable. Meanwhile, as shown in FIG. 6C, when the time constant of the filtering processing is too large, the delay of the actual engine speed relative to the target engine speed becomes large.

In the present embodiment, the time constant of the filtering processing is set according to the processing angle interval “ta” corresponding to the first processing interval. Thus, even when the first processing interval at which the engine speed is computed is varied due to variation in engine speed, the time constant of the filtering processing is also changed to a proper value. Therefore, the instability of the actual engine speed and the delay of the actual engine speed relative to the target engine speed can be reduced.

Furthermore, in the present embodiment, the time constant of the filtering processing is established smaller than or equal to the upper limit guard value and larger than or equal to the lower limit guard value. Thus, it is avoided that the time constant of the filtering processing becomes too large or too small. The time constant can be variably established in a proper range.

In the present embodiment, the present disclosure is applied to the idle speed control. However, the present disclosure may be applied to other controls. For example, it may be applied to a variable valve timing control in which a camshaft phase is computed based on outputs of the can angle sensor and a valve timing is feedback controlled based on the camshaft phase. Alternatively, it may be applied to another feedback control which uses a signal received by a controller area network (CAN) as an input signal and another feedback control in which a first processing interval and a second processing interval are different from each other (at least one of the first processing interval and the second processing interval is varied).

What is claimed is:

1. A controller for a vehicle, comprising:

an input computing portion which computes an input signal for a feedback control;

a filter portion which performs a filtering processing for filtering the input signal; and a feedback amount computing portion which computes a feedback amount based on both the input signal filtered by the filter portion and a target input value; wherein:

at least one of a first processing time interval at which the input computing portion computes the input signal and a second processing time interval at which the feedback amount computing portion computes the feedback amount is varied;

a third processing time interval at which the filter portion filters the input signal is established equal to the second processing time interval;

the filter portion sets the first processing time interval as a time constant of the filtering processing;

the first processing time interval becomes longer than the second processing time interval; and a control of a vehicle component is based on the computed feedback amount.

2. A controller for a vehicle according to claim 1, wherein:

the filter portion establishes the time constant of the filtering processing in such a manner that the time constant is smaller than or equal to an upper limit guard value and larger than or equal to a lower limit guard value.

3. A system comprising:

a sensor configured to detect an operation of an engine;

an electronic control unit configured to receive an output from the sensor, the electronic control unit comprising: a computer and a computer readable memory medium for storing instructions executable by the computer such that the electronic control unit is configured at least to perform:

an input computation which computes an input signal for a feedback control;

a filtering process for filtering the input signal;

a feedback amount computation which computes a feedback amount based on both the filtered input signal and a target input value; and a control of an engine operation parameter based on the computed feedback amount; wherein:

at least one of a first processing time interval at which the input computation computes the input signal and a second processing time interval at which the feedback amount computation computes the feedback amount is varied;

a third processing time interval at which the filtering process filters the input signal is established equal to the second processing time interval;

the filtering process sets the first processing time interval as a time constant of the filtering process; and the first processing time interval becomes longer than the second processing time interval.

4. A system according to claim 3, wherein:

the electronic control unit is further configured to establish the time constant of the filtering process in such a manner that the time constant is smaller than or equal to an upper limit guard value and larger than or equal to a lower limit guard value.

* * * * *